United States Patent [19]

Okuyama et al.

[11] Patent Number: 4,625,272

[45] Date of Patent: Nov. 25, 1986

[54] CONVERTER CONTROL APPARATUS AND METHOD

[75] Inventors: Toshiaki Okuyama, Tokai; Yuzuru Kubota, Hitachi, both of Japan

[73] Assignee: Hitachi, Ltd., Tokyo, Japan

[21] Appl. No.: 582,569

[22] PCT Filed: Jun. 17, 1983

[86] PCT No.: PCT/JP83/00197

§ 371 Date: Feb. 17, 1984

§ 102(e) Date: Feb. 17, 1984

[87] PCT Pub. No.: WO84/00086

PCT Pub. Date: Jan. 5, 1984

[51] Int. Cl.$^4$ .......................... H02P 13/24; H02J 3/18
[52] U.S. Cl. ........................................ 363/81; 323/207
[58] Field of Search ................. 323/205, 207, 299; 363/81, 85, 86, 89, 128, 129

[56] References Cited

U.S. PATENT DOCUMENTS 4,449,176  5/1984  Turnbull ............................... 363/81

FOREIGN PATENT DOCUMENTS 55-94583  7/1980  Japan .
58-64519  4/1983  Japan ................................... 323/207

Primary Examiner—Patrick R. Salce
Assistant Examiner—D. L. Rebsch
Attorney, Agent, or Firm—Antonelli, Terry & Wands

[57] ABSTRACT

The input terminals of a PWM converter are connected to the a-c power supply via a reactor. A capacitor C as well as a load 11 are connected to the d-c output terminals of the PWM converter. An apparent phase of the power supply voltage E is shifted depending upon the difference between a d-c voltage detected across both terminals of the capacitor and a set voltage, and a control signal for the PWM converter is prepared, with the shifted voltage as a reference. When the detected voltage is greater than the set voltage, the PWM converter is so controlled as to be operated with a lagging power factor, and the a-c voltage at the input terminals of the PWM converter becomes smaller than the power supply voltage. Accordingly, the d-c voltage can be maintained at a value smaller than the set voltage.

10 Claims, 14 Drawing Figures

CONVERTER CONTROL APPARATUS AND METHOD

TECHNICAL FIELD

The present invention relates to a power-supply apparatus employing a converter (PWM converter) which is controlled by pulse width modulation, and particularly to a power-supply apparatus which is capable of controlling a d-c voltage to a desired value when the converter is subjected to the regenerative operation.

BACKGROUND ART

A PWM converter has been well known, which is made up of Graetz-connected transistors or self-extinguishing elements such as gate turn-off thyristors. The magnitude and phase of an input current can be controlled if the a-c input terminals of the PWM converter are connected to an a-c power supply via reactors, and if the magnitude and phase of an a-c input voltage are instantaneously controlled with the a-c power supply voltage as a reference. It is therefore possible to arbitrarily control the effective electric power which is supplied from the a-c power supply to the PWM converter. For instance, Japanese Patent Laid-Open No. 94583/1980 proposes an apparatus and a method for this purpose. Since the effective power is converted by the PWM converter into d-c power, it is possible to control the d-c output voltage (current) to any desired value.

Feedback diodes have been connected in parallel, but in the opposite direction, with the self-extinguishing elements which constitute the PWM converter. To control the PWM converter by pulse width modulation, the d-c output voltage must be greater than diode-rectified voltage of the a-c power supply voltage. This is because, if the d-c voltage becomes smaller than the diode-rectified voltage the a-c power supply voltage, the d-c power is supplied through the feedback diodes of the PWM converter to hinder the pulse width modulation control.

Further, when the load of the PWM converter is subjected to a regenerative operation, the PWM converter will also be subjected to the regenerative operation. In this case, the d-c voltage is likely to become considerably greater than the diode-rectified voltage.

Depending upon the load connected to the d-c side of the PWM converter, on the other hand, the d-c voltage must often be equal to, or smaller than, the diode-rectified voltage of the a-c power supply voltage. When the load is an inverter or a chopper, this is necessary to prevent the elements from breaking.

Thus, when the PWM converter is used, it is strongly recommended to control the d-c voltage to make it equal to the diode-rectified voltage of the a-c power supply voltage.

DISCLOSURE OF INVENTION

The object of the present invention is to provide a power-supply apparatus which is capable of controlling the voltage on the d-c side of the PWM converter to become smaller than the diode-rectified voltage of the a-c power supply voltage. When the deviation between an instructed value and a detected value of the d-c voltage indicates that the detected value is greater than the instructed value, the power-supply apparatus is operated with a lagging power factor. Therefore, the a-c voltage input to the PWM converter is made smaller than the a-c power supply voltage, thereby to decrease the voltage on the d-c side.

BEST MODE FOR CARRYING OUT THE INVENTION

Figure 1:
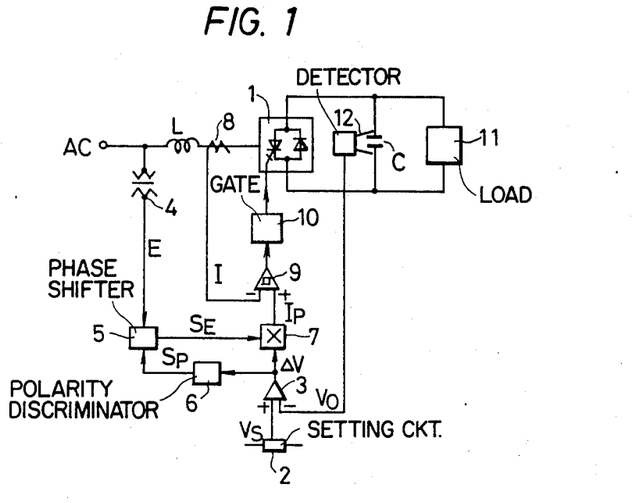
FIG. 1 a diagram showing the setup according to an embodiment of the present invention.
Figure 2:
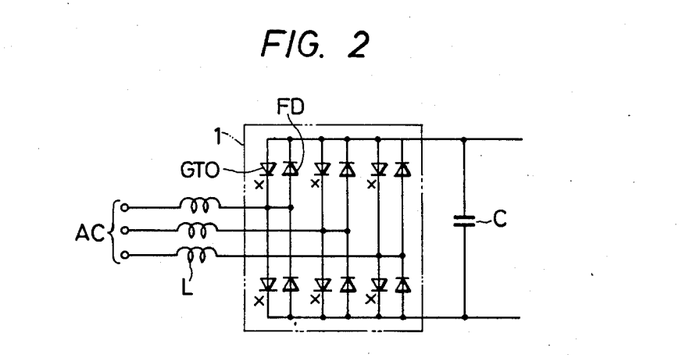
FIG. 2 is a detailed circuit diagram of a PWM converter.

In FIG. 1, a PWM converter 1 is connected to an a-c power supply AC via a reactor L. The PWM converter 1 consists, as shown in FIG. 2, of gate turn-off thyristors GTO that are Graetz-connected, and feedback diodes FD that are connected in parallel with the gate turn-off thyristors GTO but in the opposite direction. A load 11 and a smoothing capacitor C are connected across the d-c output terminals of the PWM converter 1. The voltage (d-c output voltage of the PWM converter 1) across the terminals of the capacitor C is detected by a voltage detector 12. A setpoint value $V_S$ of a voltage setting circuit 2 which sets the magnitude of d-c output voltage the the converter 1 and an actual value $V_O$ detected by the voltage detector 12 are applied to a voltage comparator 3 maintaining polarities as shown. A voltage deviation signal $\Delta V$ of the voltage comparator 3 is applied to a polarity discrimination circuit 6 and to a current instruction circuit 7. The a-c power supply voltage E of the a-c power supply AC is detected by a transformer 4, and is applied to a phase shifter 5 which shifts the phase of the a-c power supply voltage E by a predetermined angle, depending upon the polarity of a polarity signal Sp of the polarity discrimination circuit 6, and applies a phase-shifted a-c power supply voltage signal $S_E$ to the current instruction circuit 7. The current instruction circuit 7 applies a current instruction signal $I_P$ (instantaneous value instruction of an a-c input current of the converter 1) obtained by multiplying the phase-shifted a-c power supply voltage $S_E$ by the voltage deviation signal $\Delta V$ to a comparator 9, maintaining a polarity as shown. The a-c input current I flowing into the converter 1 is detected by a current transformer 8. The comparator 9 has hysteresis characteristics, and generates a PWM signal depending upon the deviation between the current instruction signal $I_P$ and the detected value I, and applies it to a gate circuit 10.

FIG. 1 shows the components for one phase only. Therefore, the components 7 to 10 must also be provided for the other two phases, but are not diagrammed.

Next, prior to describing the operation of FIG. 1, the principle of conversion operation of a PWM converter will be described below so that the invention can be easily comprehended.

Figure 4:
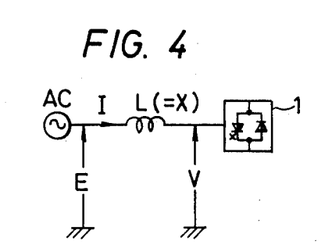
FIG. 4 is a diagram which schematically shows the setup to explain the principle of the present invention.

FIG. 4 shows in a simplified manner the a-c power supply AC and the converter 1, wherein E denotes an a-c power supply voltage, V denotes an a-c input voltage of the converter 1, and I denotes an a-c input current.

Figure 5A:
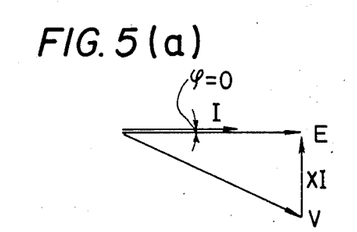
FIGS. 5(a) and (b) and 6(a) and (b) are vector diagrams for explaining the principle of the present invention.
Figure 5B:
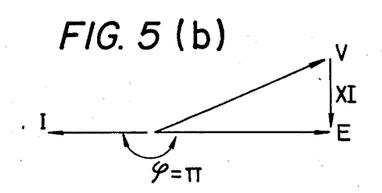

FIG. 5 is a vector diagram showing a relation between the voltages E, V and the current I, and wherein the diagram (a) illustrates the case of a forward conversion operation, and the diagram (b) illustrates the case a reverse conversion operation.

As will be understood from FIG. 5, the voltage applied to the reactor X undergoes change if the magnitude and phase of the a-c input voltage V are changed with the voltage E as a reference. Accordingly, the magnitude and phase $\phi$ of the a-c input current I are adjusted. FIG. 5 shows the case when the converter 1 performs the operation with a unity power factor. By so controlling that the current I comes in phase (or in opposite phase) with the power supply voltage E, the operation can be carried out with the unity power factor of the power supply. In this case, however, the input voltage V becomes greater than the power supply voltage E due to a voltage drop XI through the reactor.

In the PWM converter 1, on the other hand, the gate turn-off thyristors GTO of the positive side and the negative side are rendered conductive alternatingly, and the d-c voltage of positive polarity and the d-c voltage of negative polarity appear alternatingly at the a-c input terminals of the converter 1. The ratio of positive and negative polarities changes continuously depending upon the PWM signals, and the fundamental wave of the a-c input voltage V is controlled according to a sinusoidal wave. Thus, since the a-c input voltage V is obtained by pulse-width controlling the d-c voltage, a maximum value in the fundamental wave of the input voltage V is limited by the d-c voltage. In other words, when the d-c voltage is not sufficiently great, it is not allowed to perform the above-mentioned operation relying upon the PWM signals, and it becomes difficult to control the input voltage V to a desired value. In performing the operation with the unity power factor of the power supply, the input voltage V increases in proportion to the magnitude of the current I. Therefore, the d-c voltage must be set to a higher value to provide a margin.

Figure 6A:
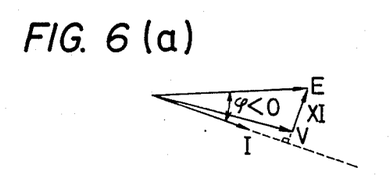
Figure 6B:
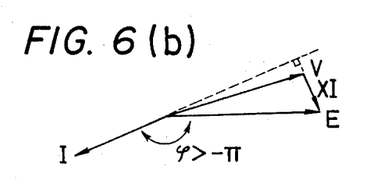

FIG. 6 is a vector diagram showing the principle of the present invention, wherein the diagram (a) shows the case of a forward conversion operation, and the diagram (b) shows the case of a reverse conversion operation.

As will be obvious from FIG. 6, in the case of the forward conversion operation, the phase of the current I is lagged within a range of $0 < \phi < 90°$ with respect to the voltage E, and in the case of the reverse conversion operation, the phase of the current I lags within a range of $90° < \phi < 180°$ with respect to the voltage E, and whereby the a-c input voltage V becomes smaller than the a-c power supply voltage E due to the voltage drop XI through the reactor L. Therefore, the d-c voltage can be smaller than a diode-rectified voltage of the a-c power supply voltage E.

The foregoing was described the principle of the present invention. To realize this principle, described below is the operation of the embodiment of FIG. 1.

Figure 3:
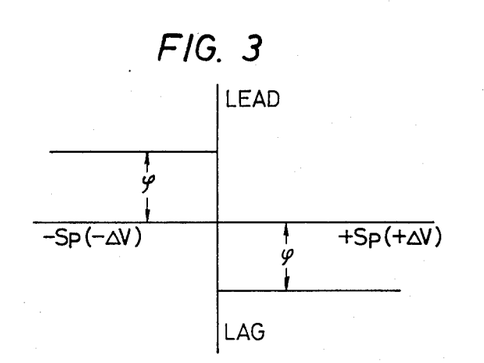
FIG. 3 is a diagram showing characteristics of a phase shifter of FIG. 1.

The setpoint value VS of the voltage setting circuit 2 and the actual value $V_O$ detected by the voltage detector 12 are compared by a voltage comparator 3. A voltage deviation signal $\Delta V$ of the voltage comparator 3 is applied to the polarity discrimination circuit 6 and to the current instruction circuit 7. The PWM converter 1 performs the conversion operation in the forward direction when the voltage deviation signal $\Delta V$ has positive polarity and performs the conversion operation in the reverse direction when the voltage deviation signal $\Delta V$ has a negative polarity. The polarity discrimination circuit 6 discriminates the polarity of voltage deviation signal $\Delta V$ and sends a polarity signal $S_P$ to the phase shifter 5. Depending upon the polarity signal $S_P$, the phase shifter 5 shifts the phase of the a-c power supply voltage E detected by the transformer 4 by a predetermined angle, and produces a phase-shifted sinusoidal wave signal $S_E$. In practice, the phase lags by a predetermined angle $\phi$ when the voltage deviation signal $\Delta V$ has the positive polarity as shown in FIG. 3, and the phase is advanced by the predetermined angle $\phi$ when the voltage deviation signal $\Delta V$ has the negative polarity. The angle $\phi$ is selected within a range of $0 < \phi < 90°$. The current instruction circuit 7 multiplies the phase-shifted sinusoidal wave signal $S_E$ by the voltage deviation signal $\Delta V$ and generates a current instruction signal $I_P$. The comparator 9 compares the current instruction signal $I_P$ with an a-c input current I detected by the current transformer 8, and produces a PWM signal. By controlling the firing operation of the PWM converter 1 relying upon the PWM signal of the comparator 9, the magnitude and phase of the a-c input current I can be brought into agreement with the current instruction signal $I_P$.

The PWM converter 1 is thus controlled, and the a-c input current I is controlled with regard to its instantaneous value so as to be varied in proportion to the current instruction signal $I_P$. Therefore, when the converter 1 performs the conversion operation in the forward direction, the phase of the a-c input current I lags by the angle $\phi$ with respect to the a-c power supply voltage E as shown in FIG. 6(a). When the conversion operation is performed in the reverse direction, the phase shifter 5 advances the phase of the phase-shifted sinusoidal wave signal $S_E$ by the angle $\phi$ with respect to the a-c power supply voltage E. However, since the voltage deviation signal $\Delta V$ has the negative polarity, the current instruction signal $I_P$ possesses the phase opposite to that of the phase-shifted sinusoidal wave signal $S_E$. In the case of the conversion operation in the reverse direction, the phase of the a-c input current I lags by $(\pi - \phi)$ with respect to the a-c power supply voltage as shown in FIG. 6(b). Whenever the PWM converter 1 performs the conversion operation in the forward direction or in the reverse direction, therefore, the a-c input voltage V can be made smaller than a diode-rectified voltage of the a-c power supply voltage E. Consequently, the voltage on the d-c side of the PWM converter 1 can be made smaller than the diode-rectified voltage of the a-c power supply voltage E.

As described above, the a-c input voltage of the PWM converter can be made to be smaller than the diode-rectified voltage of the a-c power supply voltage and, hence, the d-c output voltage of the converter can be made smaller than the diode-rectified voltage of the a-c power supply voltage. Accordingly, the d-c output voltage of the converter can be set to a voltage that is required for the load.

In the embodiment of FIG. 1, furthermore, the phase shifter 5 shifts the phase by a predetermined angle. Therefore, the phase shifter may be a first-order lag circuit which is simply constructed.

Figure 7:
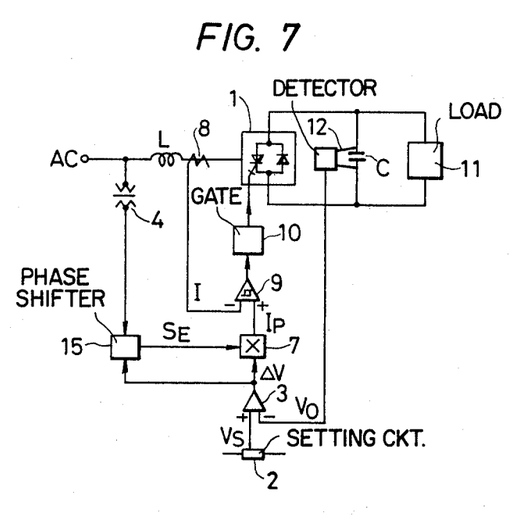
FIG. 7 is a diagram showing the setup according to another embodiment of the present invention.

FIG. 7 shows another embodiment of the present invention.

According to the embodiment of FIG. 7, the a-c input voltage V is maintained constant at all times irrespective of the a-c input current I.

In FIG. 7, what makes a difference from FIG. 1 is that the voltage deviation signal $\Delta V$ of the voltage comparator 3 is directly applied to the phase shifter 15.

Figure 9:
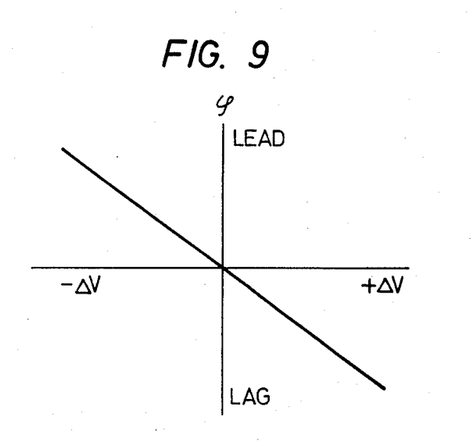
FIG. 9 is a diagram showing characteristics of a phase shifter of FIG. 7.

The phase shifter 15 has such phase-shifting characteristics as to change the phase-shifting angle $\phi$ in proportion to the magnitude of voltage deviation signal $\Delta V$ as shown in FIG. 9.

Figure 8:
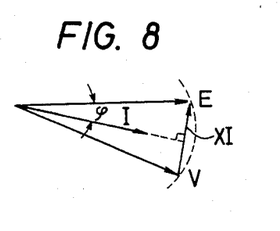
FIG. 8 is a vector diagram for explaining the operation of FIG. 7.

To maintain the a-c input voltage V constant irrespective of the a-c input current I, the phase-shifting angle $\phi$ should be changed according to the following equation.

$$\phi = \sin^{-1}\frac{XI}{ZE} \quad (1)$$

as will be obvious from a vector diagram of FIG. 8.

In the equation (1), the reactance X of the reactor L and the a-c power supply voltage E remain constant, and the phase-shifting angle $\phi$ is determined by $\sin^{-1} I$. The magnitude of the current I is controlled by the voltage deviation signal $\Delta V$. Therefore, by applying the voltage deviation signal $\Delta V$ to the phase shifter 15 to continuously change the phase-shifting angle $\phi$, maintaining a relation as shown in FIG. 9, the voltage V changes along a locus indicated by a dotted line in FIG. 8 and remains constant at all times.

Even in the embodiment of FIG. 7, the a-c input voltage can be decreased, and the phase-shifting angle $\phi$ can be made smaller than that of the case of FIG. 1 under light-load conditions, in order to carry out the operation with a good power factor.

The feature of these embodiments resides in that the phase of an a-c power supply voltage signal obtained by detecting the a-c power supply voltage is shifted toward the lagging side or the advancing side depending upon the polarity of a voltage deviation signal between an instructed value of the d-c voltage and an actual value, the thus phase-shifted a-c power supply voltage signal is multiplied by the voltage deviation signal to, obtain a current instruction signal, and the firing operation of the PWM converter is controlled by the current instruction signal, so that the phase of the a-c input current lags behind the a-c power supply voltage.

Further embodiments will be described below in conjunction with FIGS. 10 to 12. The feature of these embodiments resides in that a first voltage and a second voltage are obtained from the a-c power supply voltage, the first voltage having a phase same as the phase voltage and the second voltage having a phase which is deviated by 90° from the phase voltage, and that the d-c voltage of the PWM converter is controlled by utilizing the first and second voltages.

Figure 10:
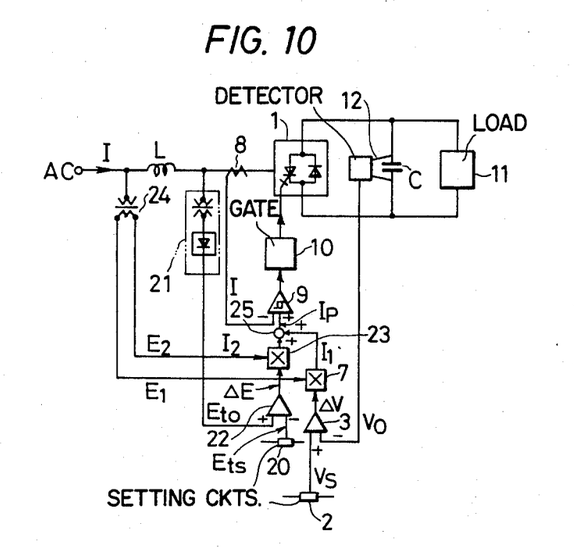
FIGS. 10 and 11 are diagrams showing setups according to further embodiments.
Figure 11:
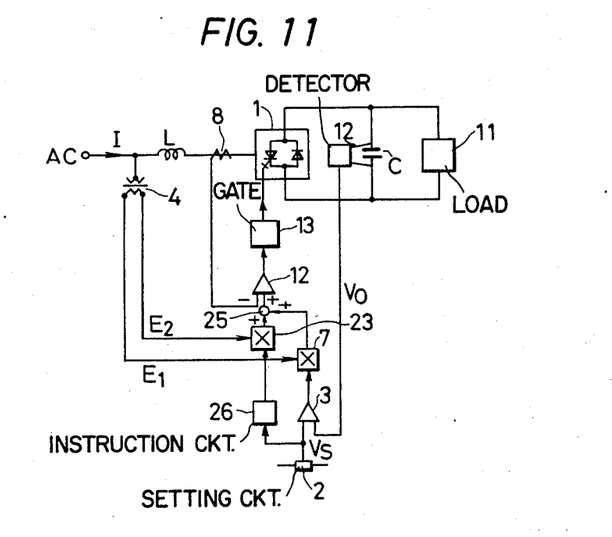

In the embodiments of FIGS. 10 and 11, the portions denoted by the same reference numerals as those of FIG. 1 represent the same portions as or exhibit equivalent functions to those of FIG. 1.

In FIG. 10, a PWM converter 1 is connected to the a-c power supply AC via the reactor L. The PWM converter 1 consists, as shown, for example, in FIG. 2, of gate turn-off thyristors GTO that are Graetz-connected, and feedback diodes FD that are connected in parallel with the gate turn-off thyristors GTO but in the opposite direction. A load 11 and a smoothing capacitor C are connected across the d-c output terminals of the PWM converter 1. The voltage (d-c output voltage of the PWM converter 1) across both terminals of the capacitor C is detected by the voltage detector 12. A setpoint value $V_S$ of the d-c voltage setting circuit 2 which sets the magnitude of d-c output voltage of the converter 1 and an actual value $V_O$ detected by the voltage detector 12 are applied to the voltage comparator 3 maintaining polarities as shown. A d-c voltage deviation signal $\Delta V$ of the voltage comparator 3 is input to the multiplier 7. A setpoint value (d-c signal) $E_{ts}$ of an a-c voltage setting circuit 20 which sets the intensity of the a-c input voltage applied to the converter 1, and a detected value $E_{t0}$ of a voltage detector 21 which detects the a-c input voltage, are applied to a voltage comparator 22 maintaining polarities as diagrammed. An a-c voltage deviation signal (d-c signal) $\Delta E$ of the voltage comparator 22 is input to a multiplier 23. A transformer 24 detects the a-c power supply voltage (phase voltage) E of the a-c power supply AC, and produces a first voltage $E_1$ of the same phase as the voltage E and a second voltage $E_2$ having a phase which lags by 90° behind the voltage E. The voltage $E_1$ is input to the multiplier 7 and the voltage $E_2$ is input to the multiplier 23. The multiplier 7 multiplies the voltage $E_1$ by the d-c voltage deviation signal $\Delta V$, and produces an active-component current instruction signal $I_1$ having the same phase as the power supply voltage E of the power supply current I. The multiplier 23 multiplies the voltage $E_2$ by the a-c voltage deviation signal $\Delta E$ and produces a reactive-component component current instruction signal $I_2$ having a phase which lags by 90° behind the power supply voltage E. An adder 25 adds vectors of the two current instruction signals $I_1$ and $I_2$, and applies a current instruction signal $I_P$ to the comparator 9 maintaining a polarity as diagramed. The a-c input current I flowing into the converter 1 is detected by a current transformer 8. The comparator 9 has hysteresis characteristics, generates a PWM signal depending upon the deviation between the current instruction signal $I_P$ and the detected value I, and applies it to the gate circuit 10.

The setpoint value $V_S$ set by the d-c voltage setting circuit 2 and the actual value $V_O$ detected by the voltage detector 12 are compared by the voltage comparator 3. The voltage deviation signal $\Delta V$ of the voltage comparator 3 is input to the multiplier 7 which multiplies the first voltage $E_1$ detected by the transformer 24 by the voltage deviation signal $\Delta V$ to produce the current instruction signal $I_1$ by changing the amplitude of the voltage $E_1$ responsive to the magnitude of the voltage deviation signal $\Delta V$. The current instruction signal $I_1$ is in phase with the power supply voltage E, and instructs the magnitude of the active component in the power supply current I. On the other hand, the setpoint value $E_{ts}$ of the a-c voltage setting circuit 20 and the actual value $E_{t0}$ detected by the voltage detector 21 are compared by the voltage comparator 22, and a voltage deviation signal $\Delta E$ which is a difference therebetween is input to the multiplier 23. Here, the setpoint values of the voltage setting circuits 2, 22 are selected to maintain a relation $V_S > E_{ts}$. The multiplier 23 multiplies the second voltage $E_2$ by the voltage deviation signal $\Delta E$, and produces a current instruction signal $I_2$ by changing the amplitude of the voltage $E_2$ in proportion to the magnitude of the voltage deviation signal $\Delta E$. The current instruction signal $I_2$ has a phase difference of 90° with respect to the power supply voltage E, and instructs the magnitude of the reactive component in the power supply current I. The two current instruction signals $I_1$, $I_2$ of the multipliers 7, 23 are added together through the adder 25 to form a current instruction signal $I_P$. The current instruction signal $I_P$ and the a-c input current I detected by the current transformer 8 are compared by the comparator 9 which produces a PWM signal. By controlling the firing operation of the PWM converter 1 responsive to the PWM signals produced by the comparator 9, it is possible to bring the magnitude and phase of the a-c input current I into agreement with the current instruction signal $I_P$.

The PWM converter 1 is controlled as mentioned above. Here, the a-c input current I is controlled with regard to its instantaneous value so as to be varied in proportion to the current instruction signal $I_P$. The current instruction signal $I_P$ consists of vectors of the active-component current instruction signal $I_1$ and the reactive-component current instruction signal $I_2$. The amplitude of the active-component current instruction signal $I_1$ changes in proportion to the voltage deviation signal $\Delta V$. Therefore, the active component $I_1$ of a-c input current I is controlled responsive to the d-c voltage deviation signal $\Delta V$. The d-c output current of the PWM converter 1 varies in proportion to the active component $I_1$ of the a-c input current I. Therefore, the d-c output voltage $V_O$ of the PWM converter 1 is so controlled as to assume the setpoint value $V_S$ that is set by the d-c voltage setting circuit 2. The amplitude of the reactive-component current instruction signal $I_2$, on the other hand, changes in proportion to the voltage deviation signal $\Delta E$. Therefore, the a-c input voltage $E_{t0}$ is so controlled as to come into agreement with the setpoint value $E_{ts}$.

As described above, the d-c voltage $V_O$ and the a-c input voltage $E_t$ s are controlled to assume setpoint values $V_S$ and $E_{ts}$. The current phase $\phi$ becomes small when $V_S > V_O$ and becomes large when $E_{t0} > E_{ts}$.

When $V_O > V_S$, the active-component current instruction signal $I_1$ assumes the phase opposite to that of the a-c power supply voltage E, since the voltage deviation signal $\Delta V$ has the negative polarity. Therefore, the PWM converter 1 performs the conversion operation in the reverse direction.

In the embodiment of FIG. 10, furthermore, the d-c voltage $V_O$ can be adjusted to meet the requirement of the load by changing the a-c input voltage setpoint value $E_{ts}$ to follow the d-c voltage setpoint value $V_S$.

The embodiment of FIG. 11 will be described below.

According to this embodiment, the reactive component $I_2$ in the a-c input current I is directly controlled depending upon the magnitude of the d-c voltage setpoint value $V_S$.

In FIG. 11, what makes a difference from FIG. 10 is that provision is made of a reactive current instruction circuit 26 which produces a reactive-component control signal $I_2$ responsive to the d-c voltage setpoint value $V_S$, and the reactive-component control signal $I_2$ produced by the instruction circuit 26 is applied to the multiplier 23.

Figure 12:
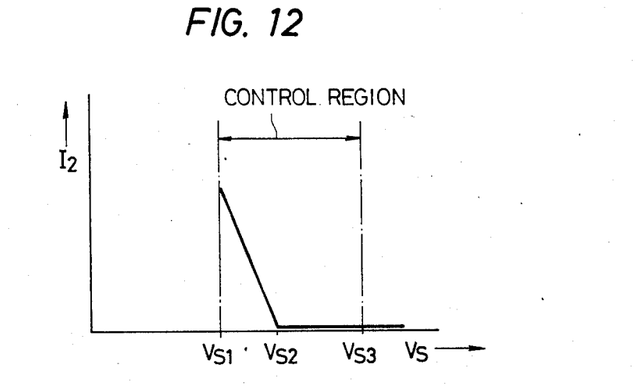
FIG. 12 is a diagram showing characteristics of a reactive current instruction circuit in the embodiment of FIG. 11.

As shown in FIG. 12, the reactive current instruction circuit 26 works to set the reactive current $I_2$ to zero when the d-c voltage setpoint value $V_S$ lies over a range of predetermined values $V_{S2}$ to $V_{S3}$, and works to gradually increase the reactive current $I_2$ when the d-c voltage setpoint value $V_S$ lies over a range of predetermined values $V_{S2}$ to $V_{S1}$.

According to the present invention as mentioned in the foregoing, it is allowed to decrease the voltage on the d-c side of the PWM converter to become smaller than the diode-rectified voltage of the a-c power supply voltage. Accordingly, the magnitude of the d-c voltage applied to the load can be arbitrarily set depending upon the withstand voltage of the load.

In the above-mentioned embodiments, a PWM signal is obtained relying upon a current difference between the current instruction signal and the a-c input current. The PWM signal, however, can also be obtained by using a current instruction signal and a triangular carrier wave.

The PWM converter may also be made up of transistors and diodes, as a matter of course.

In the aforementioned embodiments, the PWM converter is connected to the a-c power supply via the reactor L. The reactor, however, may be omitted. The reason is that the reactor contained in the power supply system to which the PWM converter is connected produces the same action as the above-mentioned reactor. In this case, the input a-c voltage applied to the PWM converter is detected instead of detecting the a-c power supply voltage, and is converted into a sinusoidal wave signal via a filter to utilize it as the a-c power supply voltage.

What is claimed is:

1. A power-supply apparatus comprising:
    a PWM converter for converting an a-c power supply voltage into a d-c voltage;
    a capacitor connected across the d-c output terminals of said PWM converter;
    a load connected across the d-c output terminals of said PWM converter;
    a voltage comparator for comparing a setpoint value of said d-c voltage with a detected value of said d-c voltage and for producing a voltage deviation signal in accordance therewith, said PWM converter being controlled in accordance with said voltage deviation signal;
    a voltage detector for detecting said a-c power supply voltage;
    a phase shifter for shifting the phase of an a-c power supply voltage signal detected by said voltage detector toward the advancing side or the lagging side depending upon the polarity of said voltage deviation signal;
    a current instruction circuit for multiplying said a-c power supply voltage signal having the phase thereof shifted by said phase shifter by said voltage deviation signal so as to produce a current instruction signal; and
    a firing control circuit for controlling the firing operation of said PWM converter in dependence upon said current instruction signal.

2. A power-supply apparatus according to claim 1, wherein said phase shifter shifts the a-c power supply voltage signal by a predetermined angle.

3. A power-supply apparatus according to claim 1, wherein said phase shifter changes the phase-shifting angle for the a-c power supply voltage signal depending upon the magnitude of said voltage deviation signal.

4. A power-supply apparatus comprising:
    a PWM converter for converting an a-c power supply voltage into a d-c voltage;

a capacitor connected across the d-c output terminals of said PWM converter;

a load connected across the d-c output terminals of said PWM converter;

a voltage comparator for comparing a setpoint value of said d-c voltage with a detected value of said d-c voltage and for producing a voltage deviation signal in accordance therewith, said PWM converter being controlled in accordance with said voltage deviation signal;

reactive current instruction means for producing a reactive-component control signal for instructing the magnitude of a reactive component in an a-c input current flowing into said PWM converter;

a transformer for detecting said a-c power supply voltage and for producing a first voltage having the same phase as said a-c power supply voltage and a second voltage having a phase different by 90° from said a-c power supply voltage;

current instruction means for multiplying said first voltage by said voltage deviation signal to obtain an active-component instruction signal, said current instruction means multiplying said second voltage by said reactive-component control signal to obtain a reactive-component instruction signal, said current instruction means adding said active-component instruction signal and said reactive-component instruction signal for producing a current instruction signal; and firing control means for controlling the firing operation of said PWM converter in dependence upon said current instruction signal.

5. A power-supply apparatus according to claim 4, wherein said reactive current instruction means includes means for comparing a setpoint value of an a-c input voltage of said PWM converter with a detected value thereof and for producing a voltage deviation signal therebetween as a reactive component control signal.

6. A method of controlling a PWM converter of a power-supply apparatus including a PWM converter for converting an a-c power supply voltage into a d-c voltage, a capacitor connected across the d-c output terminals of the PWM converter, and a load connected across the d-c output terminals of the PWM converter, the method comprising the steps of:

comparing a setpoint value of the d-c voltage with a detected vale of the d-c voltage and for producing a voltage deviation signal in accordance therewith;

controlling the PWM converter in accordance with the voltage deviation signal;

detecting the a-c power supply voltage;

shifting the phase of the detected a-c power supply voltage signal toward the advancing side of the lagging side depending upon the polarity of the voltage deviation signal;

multiplying the a-c power supply voltage signal which has the phase thereof shifted by the voltage deviation signal so as to produce a current instruction signal; and controlling the firing operation of the PWM converter in dependence upon the current instruction signal.

7. a method according to claim 6, wherein the step of shifting the phase of the a-c power supply voltage signal includes shifting the phase by a predetermined angle.

8. A method according to claim 6, wherein the step of shifting the phase of the a-c power supply voltage signal includes changing the phase-shifting angle for the a-c power supply voltage signal depending upon the magnitude of the voltage deviation signal.

9. A method for controlling the PWM converter of a power-supply apparatus including a PWM converter for converting an a-c power supply voltage into a d-c voltage, a capacitor connected across the d-c output terminals of the PWM converter, and a load connected across the d-c output terminals of the PWM converter, the method comprising the steps of:

comparing a setpoint value of the d-c voltage with a detected value of the d-c voltage and producing a voltage deviation signal in accordance therewith;

controlling the PWM converter in accordance with the voltage deviation signals;

producing a reactive-component control signal for instructing the magnitude of the reactive component in an a-c input current flowing into the PWM converter;

detecting the a-c power supply voltage and producing a first voltage having the same phase as the a-c power supply voltage and a second voltage having a phase different by 90° from the a-c power supply voltage;

multiplying the first voltage by the voltage deviation signal to obtain an active-component instruction signal;

multiplying the second voltage by the reactive-component control signal to obtain a reactive component instruction signal;

adding the active-component instruction signal and the reactive-component instruction singal to produce a current instruction signal; and controlling the firing operation of the PWM converter in dependence upon the current instruction signal.

10. A method according to claim 9, wherein the step of producing a reactive-component control signal includes comparing a setpoint value of an a-c input voltage of the PWM converter with a detected value and producing the voltage voltage deviation signal therebetween as the reactive-component control signal.

* * * * *